(12) United States Patent
Gullickson et al.

(10) Patent No.: US 11,220,623 B2
(45) Date of Patent: Jan. 11, 2022

(54) FLOW CONSTRAINT MATERIAL AND SLURRY COMPOSITIONS

(71) Applicant: Halliburton Energy Services, Inc., Houston, TX (US)

(72) Inventors: Geoffrey Wedell Gullickson, Denver, CO (US); William Owen Alexander Ruhle, Denver, CO (US); John Dean Stabenau, Littleton, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 16/097,804

(22) PCT Filed: Jun. 6, 2016

(86) PCT No.: PCT/US2016/036082
§ 371 (c)(1),
(2) Date: Oct. 30, 2018

(87) PCT Pub. No.: WO2017/213625
PCT Pub. Date: Dec. 14, 2017

(65) Prior Publication Data
US 2019/0119564 A1  Apr. 25, 2019

(51) Int. Cl.
| C09K 8/68 | (2006.01) |
| C09K 8/80 | (2006.01) |
| E21B 43/267 | (2006.01) |
| C09K 8/60 | (2006.01) |
| C09K 8/88 | (2006.01) |
| C08G 63/08 | (2006.01) |

(52) U.S. Cl.
CPC .............. *C09K 8/68* (2013.01); *C08G 63/08* (2013.01); *C09K 8/60* (2013.01); *C09K 8/80* (2013.01); *C09K 8/88* (2013.01); *E21B 43/267* (2013.01)

(58) Field of Classification Search
CPC ... C09K 8/60; C09K 8/68; C09K 8/80; C09K 8/88; C08G 63/08; E21B 43/267
See application file for complete search history.

(56) References Cited

U.S. PATENT DOCUMENTS

| 3,811,519 A | 5/1974 | Driver |
| 4,035,023 A | 7/1977 | Cockrell |
| 4,828,050 A | 5/1989 | Hashimoto |
| 5,890,536 A | 4/1999 | Nierode et al. |
| 6,352,110 B1 | 3/2002 | Langseth et al. |
| 6,644,848 B1 | 11/2003 | Clayton et al. |
| 6,736,905 B2 | 5/2004 | Smith et al. |

(Continued)

FOREIGN PATENT DOCUMENTS

| AU | 2012381021 | 10/2015 |
| WO | 2015188115 | 12/2015 |

OTHER PUBLICATIONS

International Search Report and Written Opinion of PCT Application No. PCT/US2016/036070 dated Feb. 13, 2017: pp. 1-15.

(Continued)

*Primary Examiner* — Aiqun Li
(74) *Attorney, Agent, or Firm* — Chamberlain Hrdlicka

(57) ABSTRACT

A flow constraint material consists essentially of degradable particles, where at least 50% by volume of the degradable particles have an average particle size of about 1 millimeters (mm) to about 6 mm.

11 Claims, 2 Drawing Sheets

(56) References Cited

U.S. PATENT DOCUMENTS

| | | |
|---|---|---|
| 6,826,343 B2 | 11/2004 | Davis et al. |
| 8,905,133 B2 | 12/2014 | Potapenko et al. |
| 8,978,764 B2 | 3/2015 | Dusseault et al. |
| 9,145,766 B2 | 9/2015 | Fripp et al. |
| 9,822,636 B2 | 11/2017 | Chu |
| 9,915,137 B2 | 3/2018 | Alekseenko et al. |
| 10,001,003 B2 | 6/2018 | Dusseault et al. |
| 2006/0185848 A1 | 8/2006 | Surjaatmadja et al. |
| 2008/0200352 A1 | 8/2008 | Willberg et al. |
| 2010/0212906 A1* | 8/2010 | Fulton .................. C09K 8/68 166/308.5 |
| 2011/0011595 A1 | 1/2011 | Huang et al. |
| 2011/0185815 A1 | 8/2011 | McCann |
| 2012/0024530 A1 | 2/2012 | Todd et al. |
| 2013/0199787 A1 | 8/2013 | Dale et al. |
| 2013/0341030 A1 | 12/2013 | Brannon et al. |
| 2014/0151033 A1 | 6/2014 | Xu |
| 2014/0290945 A1 | 10/2014 | Potapenko et al. |
| 2015/0041132 A1 | 2/2015 | Nelson et al. |
| 2015/0233226 A1 | 8/2015 | Holzhauser et al. |
| 2015/0252649 A1 | 9/2015 | Tang |
| 2016/0312573 A1* | 10/2016 | Kraemer ................ C09K 8/70 |

OTHER PUBLICATIONS

International Search Report and Written Opinion of PCT Application No. PCT/US2016/036082 dated Feb. 14, 2017: pp. 1-13.
McCartney et al., SPE-179115-MS: "A Family of Unique Diverting Technologies Increases Unconventional Production and Recovery in Multiple Applications—Initial Fracturing, Refracturing, and Acidizing," SPE International, 2016: pp. 1-19.
Gomaa et al., SPE-179144-MS: "Engineering Solid Particulate Diverter to Control Fracture Complexity: Experimental Study," SPE International, 2016: pp. 1-19.

* cited by examiner

FLOW CONSTRAINT MATERIAL AND SLURRY COMPOSITIONS

BACKGROUND

This section is intended to provide relevant contextual information to facilitate a better understanding of the various aspects of the described embodiments. Accordingly, it should be understood that these statements are to be read in this light and not as admissions of prior art.

Fracturing techniques are often implemented to stimulate hydrocarbon-producing reservoirs by increasing the permeability of the reservoir rocks. A fracturing fluid is introduced into the reservoir at a pressure sufficient to break or fracture the reservoir rocks. Particulate solids, e g., proppant particles, are suspended in the fracturing fluid and settle into the fractures to maintain fracture integrity and to create a conductive fracture network within the reservoir rock. The conductive fracture network is an interconnected network of fractures capable of channeling the flow of hydrocarbons from the reservoir rock and into a wellbore.

The conductive fracture network can include generated or dilated fractures that readily receive the fracturing fluid in order to produce hydrocarbons and can also include fractures that have limited productivity. In this case, the fracturing fluid gravitates towards the path of least resistance, i.e., the generated or dilated fractures with increased permeability. However, to improve the overall permeability of the reservoir, diverter or flow constraint materials may be used to force the flow of the fracturing fluid from the producing fractures and into the fractures with limited productivity. In particular, the diverter material constrains or diverts the fracturing fluid from entering the generated or dilated fractures.

BRIEF DESCRIPTION OF THE DRAWINGS

For a detailed description of the embodiments of the invention, reference will now be made to the accompanying drawings in which.

DETAILED DESCRIPTION

During fracturing of a subterranean formation, geo-mechanical, mechanical, and physical properties of a formation that are measured may include stress and strain, Young's modulus, fracture geometry, and fracture propagation, among others. Such properties of the formation can be influenced by the parameters associated with the treating fluid and additives injected into the formation to fracture the formation rock. Thus, the conditions and properties of the formation are monitored to determine how the parameters and characteristics of the treating fluid and additives, among other factors, affect and/or manipulate the formation.

Figure 1:
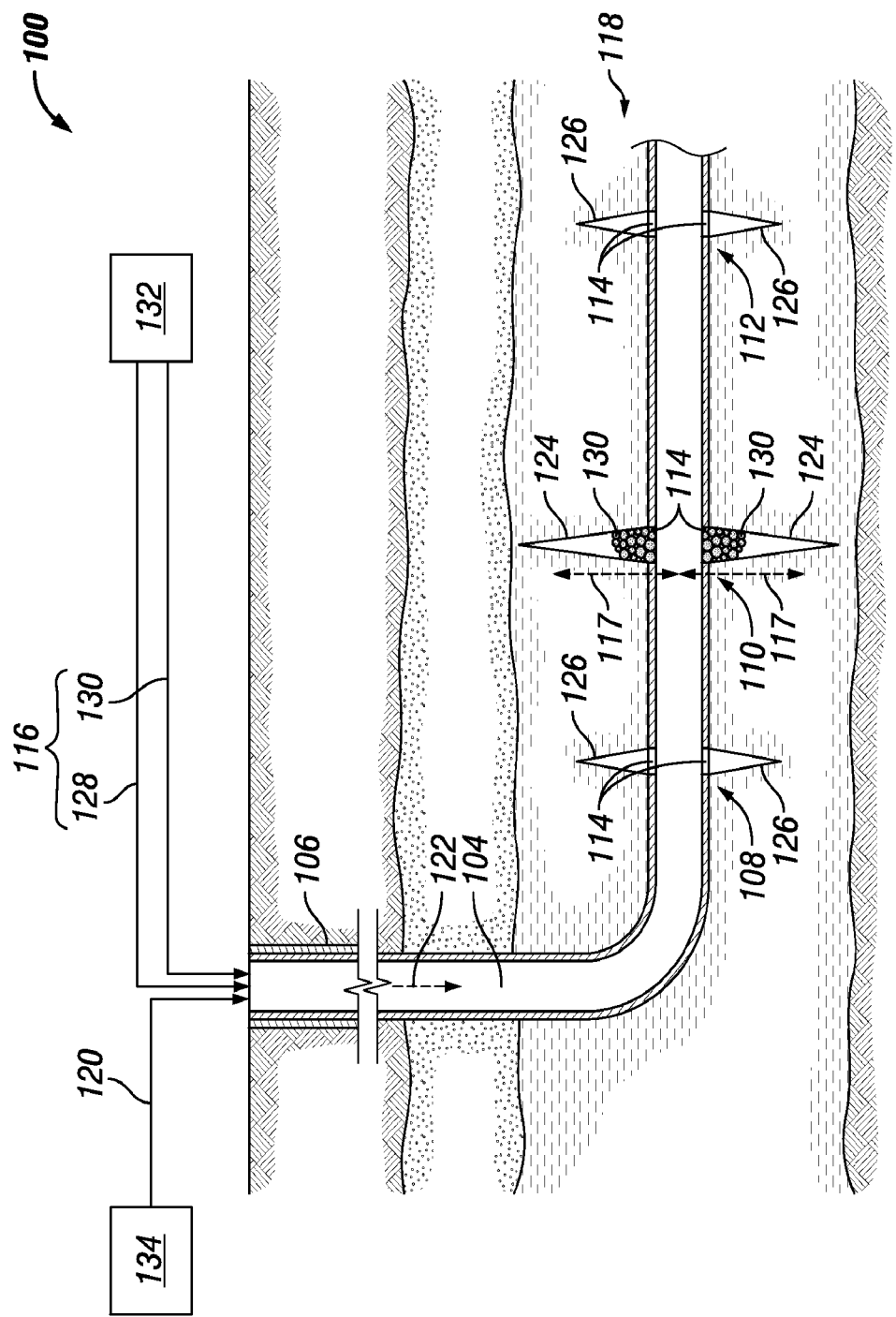
FIG. 1 is a perspective view of an example subterranean formation, according to one or more embodiments.

Referring now to FIG. 1, a perspective view of an example subterranean formation 100 according to one or more embodiments is shown. The formation 100 is composed of porous and permeable rocks that include hydrocarbons, e.g., reservoir, located in an onshore environment or in an offshore environment. The formation 100 may be located in the range of a few hundred feet (shallow) to a few tens of thousands of feet (ultra-deep) below a ground surface. A wellbore 104 is drilled to penetrate the formation 100 and to allow production of hydrocarbons from the formation 100. The wellbore 104 of FIG. 1 is formed at any suitable angle to reach the hydrocarbon-rich portion of the formation 100. For example, the wellbore 104 can follow a near-vertical, partially-vertical, angled, or even a partially-horizontal path through the formation 100. The wellbore 104 may be lined with a protective lining 106 extending through the formation 100. The protective lining 106 can include a casing, liner, piping, or tubing and is made of any material, including steel, alloys, or polymers, among others. The protective lining 106 of FIG. 1 extends vertically downward and continues horizontally to further extend through the formation 100. In other examples, the wellbore 104 can be partially or fully openhole, i.e., without the protective lining.

Hydrocarbons are located in the pore volume space of the formation 100 and may be produced when the pore spaces are connected and permeability, or the ability to transmit fluids, is such that the hydrocarbons flow out of the formation 100. In some cases, the formation 100 may have low permeability, and the hydrocarbons do not readily flow or production is hampered due to formation damage. Thus, to further stimulate and to extract the hydrocarbons, a fracturing technique is initiated to break, fracture, or induce dilation of existing natural fractures of the rock of the formation 100. The fracturing technique can include perforating the protective lining 106, or installing stimulation specific protective lining equipment, to create formation entry points 114, i.e., perforations, sliding stimulation sleeves, etc. The formation entry points 114 provide a pathway for the hydrocarbons to flow from the formation 100 and into the wellbore 104. When run with mechanical isolation and compartmentalization tools, the formation entry points can segment the formation 100 into any number of production zones where fracturing techniques can be carried out. As shown in FIG. 1, the formation 100 includes a first production zone 108, a second production zone 110, and a third production zone 112. Each zone 108, 110, 112 can be stimulated individually or simultaneously with other zones depending on the mechanical isolation and compartmentalization system employed. It should be understood that the number of zones in FIG. 1 is one example embodiment and that a wide variety of other examples, including increasing or decreasing the number of zones in the formation 100, are possible.

The fracturing technique of the embodiments includes injecting a pressurized treating fluid 116 into the wellbore 104 to stimulate one or more of the production zones 108, 110, 112. The treating fluid 116 can be stored in injection equipment 132, such as a storage tank or pipeline. The treating fluid 116 is pumped from the injection equipment 132 and into the wellbore 104 with a pressure to fracture the formation 100 that is greater than the fracture gradient or fissure opening pressure of the formation 100. In example embodiments, other suitable techniques can be used to flow the treating fluid 116 into the wellbore 104, for example, via a conduit, such as coiled tubing or piping, located within the wellbore 104. As the treating fluid 116 flows through the holes 114, the increased pressure created by the flowing treating fluid 116 cracks the formation 100 to create or further widen a network of fractures 118. The treating fluid 116 flows into the network of fractures 118 until the formation 100 is fractured to a desired length, width, and/or height. The network of fractures 118 of FIG. 1 includes active fractures 124 and inactive fractures 126. The active fractures 124 are located in a high permeable area where fluids from the formation 100 readily flow into the wellbore 104. The inactive fractures 126 are located in a low permeable area where little to no fluids are produced from the formation 100.

The treating fluid 116 includes a carrier fluid, i.e., a fracturing fluid 128, and a stimulation material 130. The fracturing fluid 128 can include energized or non-energized water, brine, gels, cross-linked fluids, mineral or organic acids, non-aqueous based fluids, or any other type of fluids capable of fracturing the formation 100 and transporting the stimulation material 130 into the fractures 124, 126. The stimulation material 130 is suspended in the fracturing fluid 128 and settles into the fractures 124,126 to hold the fractures open so as to permit the flow of hydrocarbons from the reservoir and into the wellbore 104. The stimulation material 130 can include proppant, such as small spheres composed of sand, ceramic material, plastics, and resins, or other conductivity enhancement materials.

The treating fluid 116 may include additives to optimize the fracturing technique. The types of additives used can vary depending on the properties of the formation 100 and the composition of the treating fluid 116, among other factors. In particular, the additives can include stabilizers, surfactants, foamers, gel breakers, fluid loss additives, friction reducers, scale inhibitors, biocides, and pH control additives, and the like. In the embodiments, an additive (i.e., a flow constraint material (FCM) 120) can be stored in FCM injection equipment 134 to be injected into the wellbore 104. Accordingly, the FCM 120 can flow simultaneously with the carrier fluid 128 and the stimulation material 130 into the wellbore 104. The FCM 220 can be a particulate, rheological, or chemical additive that is added to partially constrain or redistribute the flow of the treating fluid 116 to a low permeable area, e.g., inactive fractures 126, without completely diverting the fluid 116 from a high permeable area, e.g., the area where the active fractures 124 are located.

In operation, a cycle for reservoir stimulation includes initially injecting the fracturing fluid 128 into the wellbore 104 with or without the stimulation material 130. The pressure exerted by the fracturing fluid 128 initiates and propagates the fractures and the flow of the fracturing fluid 128 is maintained during the entirety of the reservoir stimulation cycle. Initially or thereafter, the stimulation material 130 is commingled with the flowing treating fluid 128 into the wellbore 104. While the fracturing fluid 128 and the stimulation material 130 are flowing, the FCM 120 is introduced at a surface location of the wellbore 104 and can be pulsed or batch blended into the wellbore 104. The FCM 120, the fracturing fluid 128, and the stimulation material 130 commingled together form a slurry 122 that flows within the wellbore 104 at a cumulative flow rate, i.e., a full job rate.

Typical injection of a diversion additive provides total diversion of the slurry 122 from the active fractures 124 and into the inactive fractures 126. Such total diversion can completely prevent the slurry 122 from flowing into the active fractures 124 to completely plug the active fractures 124. However, the FCM 120 is injected to land at a near wellbore region 117, i.e., region of the formation 100 surrounding the wellbore 104. In particular, the FCM 120 lands, or settles, at the near wellbore region 117 to partially constrain or partially hinder the treating fluid 116 from entirely flowing into active fractures 124.

In one or more embodiments, parameters (input timing, dimensions, distribution, flow rate, etc.) associated with the FCM 120 can be controlled to generate the partial flow constraint of the slurry 122 at the near wellbore region 117. Specifically, the parameters are monitored to control back-pressure at the near wellbore region 117 to partially constrain and redistribute a portion of the slurry 122 from a fracture to another fracture, for example, from the active fractures 124 to the inactive fractures 126. The partial redistribution of the slurry 122 improves the mass balance, or the total slurry volume distributed among the fractures 124, 126. Since the slurry 122 is redistributed to flow into the inactive fractures 126, the fracture lengths and widths of the inactive fractures 126 are increased to provide a passageway for hydrocarbons to exit the formation 100 and thus, increase hydrocarbon production.

The parameters associated with the FCM 120 may manipulate a bottom-hole pressure of the formation 100 as the FCM settles at the near wellbore region 117. While continuing to flow the slurry 122, the flow of the FCM 120 is paused and the bottom-hole pressure of the formation 100 is measured. The bottom-hole pressure is indicative of the applied stress (e.g., bottom-hole stress) generated to fracture the formation 100. Thus, in order to control the stress applied to the formation 100 and to maintain the partial constraining of the slurry 122, the parameters of the FCM 120 are controlled to generate a bottom-hole pressure response managed to geo-mechanical conditions identified for fracture generation for dimensional and conductive parameters.

The Young's modulus is one of several properties of the formation 100 and is the ratio of applied stress (i.e., force applied to a cross-sectional area of the formation 100) to strain (i.e., the deformation of the reservoir rock 102 due to the applied stress). In the embodiments, the Young's modulus is a fixed value based on the characteristics of the formation 100. The Young's modulus and the measured applied stress (i.e., the bottom-hole pressure) are used to determine the level of strain on the formation 100. Therefore, by manipulating the parameters of the FCM 120 to control the bottom-hole net pressure gain relative to in-situ Young's modulus conditions, a cycle on cycle formation system strain increase of about 0 to about 0.0003 or less can be attained and maintained. In the embodiments, the cycle on cycle formation system strain increase of about 0 to about 0.0003 or less can lower or alleviate brittleness, deformation, failure, and the like, of the formation 100 during a fracturing technique.

If the cycle on cycle formation system strain increase falls outside of the about 0 to about 0.0003 or less range, the flow of FCM 120 is halted until desired parameters are again encountered. If the cycle on cycle formation system strain increase falls within the about 0 to about 0.0003 or less range, the flow of the FCM 120 is continued or resumed at programmed intervals and the FCM parameters are further manipulated as the bottom-hole pressure managed to in-situ Young's modulus conditions allows. Accordingly, the number of cycles (e.g., one or more cycles) for flowing the FCM 120 continues as long as the cycle on cycle system strain is about 0.0003 or less, or the designed mass balance of the fracturing fluid 128 and stimulation material 130 is achieved.

In other examples, the cycle for reservoir stimulation can vary depending on the characteristics of the formation 100 and the type of productivity desired, among other considerations. For example, the flow of the stimulation material 130 can be paused while flowing the fracturing fluid 128 and the FCM 120 into the formation 100. In one or more embodiments and as will be further explained with respect to FIG. 2, the type and number of stimulation materials 130 used can change or differ (e.g., dimensions, type, etc.). For example, the conductivity of the fractures 124, 126 is improved by changing the geometry and/or dimensions of the stimulation material 130. Further, the volume of fracturing fluid 128 and the amount of stimulation material 130 can be manipulated before and after landing the FCM 120 to manage the bottom-hole pressure response specific to desired geo-mechanical parameters.

The FCM 120 and the stimulation material 130 can also be used to dehydrate and lower the volume of the fracturing fluid 128 so that the transport efficiency of the fracturing fluid 128 is reduced. When dehydrated, the stimulation material 130 is unable to flow and creates a blockage at the near wellbore region 117, thus, creating a backpressure. Accordingly, the stimulation material 130 that simultaneously flows with the FCM 120 can also be used to limit the transport capabilities of the fracturing fluid 128 so that the amount of FCM 120 required to partially constrain the slurry 122 may be reduced.

Design parameters for flowing the FCM 120 can vary based on the reservoir environment. For example, at least one cycle of FCM 120 per fracture zone flows into the formation 100. In cemented annular isolation primary stimulation applications, a minimum of one (1) cycle is executed per perforation cluster or formation entry point (i.e., sliding stimulation sleeve). In uncemented casing, tubing, or liner stimulation applications, a minimum of one (1) cycle is executed per perforation cluster or formation entry point (i.e., sliding stimulation sleeve). In an openhole environment without any completion tubulars, the mass balance (e.g., or the total slurry 122 volume) may be segmented into a minimum of four (4) cyclic applications.

The illustrative subterranean formation 100 of FIG. 1 is merely exemplary in nature and various additional components may be present that have not necessarily been illustrated in the interest of clarity. For example, additional components that may be present include, but are not limited to, pumps, monitoring units, injection equipment, sensors, and other well completion and production equipment.

Figure 2:
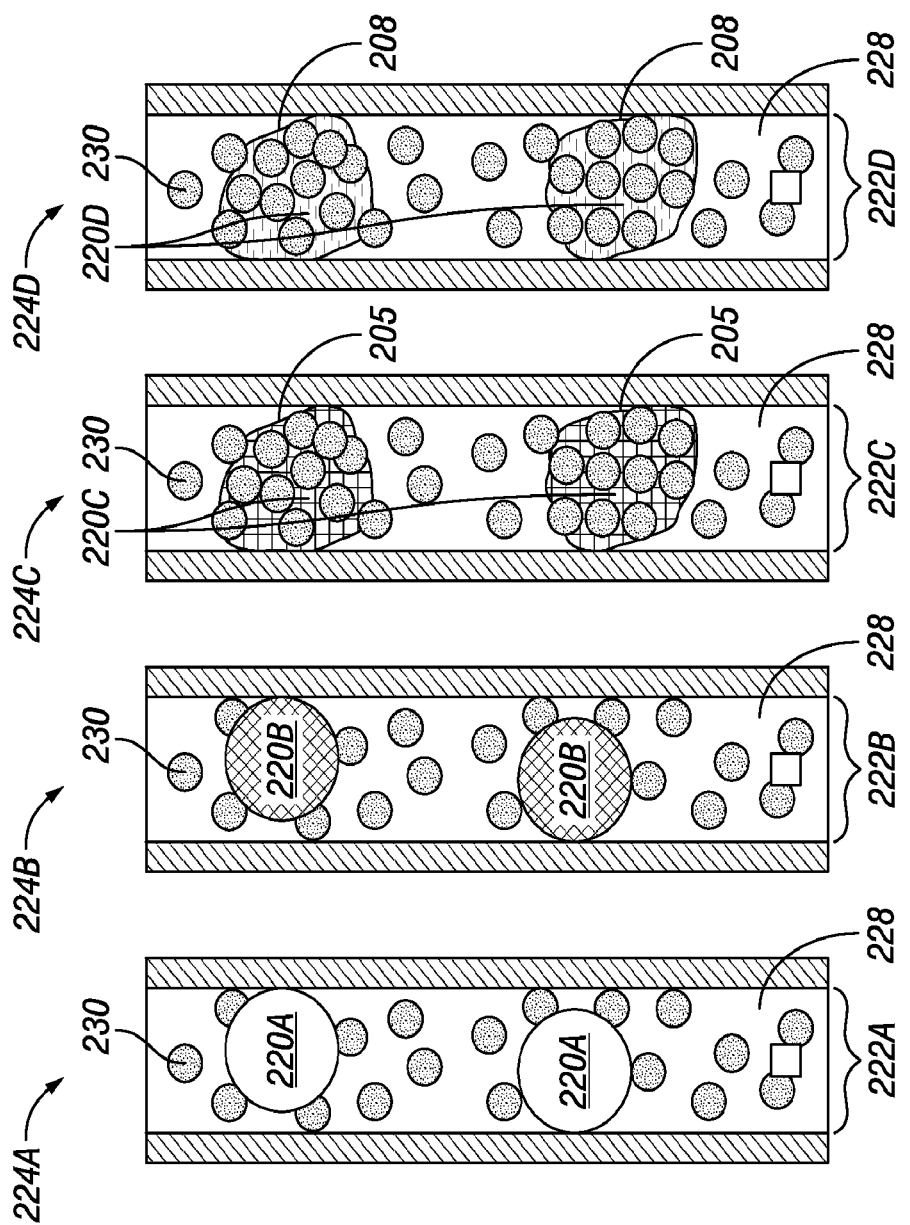
FIG. 2 illustrates distributions of the flow constraint material (FCM) within a fracture, according to one or more embodiments.

FIG. 2 illustrates distributions of flow constraint material (FCM) 220 within fractures 224A-224D, according to one or more embodiments. The fracture 224A contains a stimulation material 230 and a degradable or a slowly soluble FCM 220A. In particular, the stimulation material 230 is commingled with a variable amount of the FCM 220A in a carrier fluid 228 to form a stimulation treatment slurry 222A. Some examples of the FCM 220A include, but are not limited to, polylactic acid (PLA), benzoic acid, rock salt, anhydrous borate, and other degradable/slowly soluble inorganic and organic materials of different geometries and dimensions.

The fracture 224B contains a stimulation material 230 and a non-degradable FCM 220B. In particular, the stimulation material 230 is commingled with a variable amount of the non-degradable FCM 220B in a carrier fluid 228 to form a stimulation treatment slurry 222B. Some examples of the FCM 220B can include, but are not limited to, larger proppants, walnut hulls, other non-degradable inorganic and organic materials, and all of the above in different geometries and dimensions.

The fracture 224C contains a stimulation material 230 and an FCM 220C, such as a surface treatment agent. In particular, the FCM 220C is pulsed into a carrier fluid 228 containing the stimulation material 230 to create material clusters 205 with the stimulation material 230. The commingled mixture of the carrier fluid 228 and the material clusters 205 forms a stimulation treatment slurry 222C. Some examples of the FCM 220C material include, but are not limited to, a non-curable tackifying agent and a curable resin coating.

The fracture 224D contains a stimulation material 230 and an FCM 220D, such as a viscous fluid. The FCM 220D is pulsed into a carrier fluid 228 to create material clusters 208 with the stimulation material 230. The commingled mixture of the carrier fluid 228 and the material clusters 208 forms a stimulation treatment slurry 222D. Some examples of the FCM 220D material include, but are not limited to, cross-linked fluids, emulsified fluids, foamed fluids, viscoelastic surfactants, and clay nanoparticle-laden fluids. For ease of understanding, the FCM 220A will be used as an example to further describe the characteristics of the flow constraint material. However, it should be understood that any of the other FCMs 220B-220D could be used.

The particles of FCM 220A can include dimensions greater than the dimensions of the stimulation material 230 where the dimensions of the FCM 220A are based on the dimension selection for the stimulation material 230. For instance, the FCA 220A can include a diameter that is 2, 3, 4, 5 or more times greater than the mean diameter of the stimulation material 230. Yet, the dimensions of the FCM 220A are less than a designed perforation entry hole diameter of a casing or a formation entry point dimension in a wellbore, for example, about 80% of the perforation entry hole diameter or the formation entry point dimension. In the embodiments, the FCM 220A can have a unimodal particle distribution and can also be or include other types of flow constraint materials, or any mixture thereof. For example, the particles of the FCM 220A can have a particle distribution that is unimodal, such that about 75% by volume (vol %) of the particles can have a size distribution of +/- about 840 micrometers (μm) from the mean or average particle size.

The particles of the FCM 220A (e.g., degradable particles) can have an average particle size of about 0.5 mm, about 1 mm, about 2 mm, about 3 mm, or about 4 mm to about 5 mm, about 6 mm, about 7 mm, or about 8 mm. In some examples, the particles of the FCM 220A can have an average particle size of about 0.5 mm to about 8 mm, about 1 mm to about 7 mm, about 2 mm to about 7 mm, about 3 mm to about 6 mm, about 4 mm to about 6 mm, about 4.5 mm to about 6 mm, about 3.5 mm to about 5.5 mm, or about 4.2 mm to about 5.8 mm.

The FCM 220A can have a particle distribution of about 50 vol %, about 60 vol %, about 70 vol %, about 75 vol %, about 80 vol %, about 85 vol %, about 90 vol %, about 95 vol %, or greater of the average particle size. In other examples, the FCM 220A can have a particle distribution of at least 50 vol %, at least 60 vol %, at least 70 vol %, at least 75 vol %, at least 80 vol %, at least 85 vol %, at least 90 vol %, at least 95 vol % of the average particle size. For example, at least 75 vol %, at least 80 vol %, at least 85 vol %, at least 90 vol %, or at least 95 vol % of the particles of the FCM 220A can have an average particle size of about 2 mm to about 8 mm, about 3 mm to about 7 mm, about 4 mm to about 6 mm, about 4.5 mm to about 6 mm, about 4.2 mm to about 5.8 mm, or about 4.16 mm to about 5.84 mm.

In one or more examples, the FCM 220A can include a plurality of degradable particles whereby each of the degradable particles can independently be or include one or more suitable degradable materials. Alternatively, in other examples, the FCM 220A can consist of or consist essentially of a plurality of degradable particles whereby each of the degradable particles can independently be or include one or more suitable degradable materials. The degradable particles and/or the degradable material are capable of undergoing an irreversible degradation downhole. As used herein, the term "irreversible" means that the degradable particles and/or the degradable material, once degraded downhole, do not recrystallize or reconsolidate while downhole (e.g., the degradable particles and/or the degradable material degrade in situ but do not recrystallize or reconsolidate in situ). As used herein, the terms "degradation" or "degradable" may refer to either or both of heterogeneous degradation (or bulk erosion) and/or homogeneous degradation (or surface erosion), and/or to any stage of degradation in between these two. Not intending to be bound by theory, degradation may be a result of, inter glia, a chemical reaction, a thermal reaction, a reaction induced by radiation, or any combination thereof. In other examples, the FCM can also be or include a plurality of particles that at least consists essentially of or consists of one or more non-degradable material, surface treatment agents, viscous fluids, or any mixture thereof.

The degradable particles of the FCM 220A can be or include, but are not limited to, one or more degradable polymers, one or more anhydrous salts, or a mixture thereof. In one or more embodiments, the degradable particles of the FCM 220A can be or include one or more degradable polymers. The degradable polymer can be or include, but is not limited to, one or more degradable aliphatic polyesters having the formula:

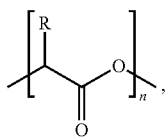

where R can be a hydrogen or a substituted or unsubstituted linear, branched, cyclic, heterocyclic, or aromatic hydrocarbyl group and n can be an integer from about 75 to about 10,000. In some examples, the hydrocarbyl group can be an alkyl, an aryl, an alkylaryl, or an acetyl. For example, the hydrocarbyl group can be methyl, ethyl, propyl, butyl, pentyl, isomers thereof, or derivatives thereof.

In one example, the degradable polymer can be or include, but is not limited to, one or more degradable polymeric lactides having the formula:

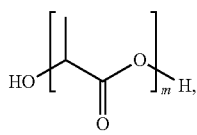

where m can be an integral from 2 to about 75.

In other examples, the degradable polymer can be or include, but is not limited to, one or more degradable polymeric lactides having the formula:

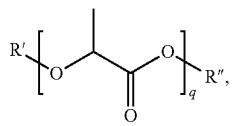

where each R' and R" can independently be a hydrogen or a substituted or unsubstituted linear, branched, cyclic, heterocyclic, or aromatic hydrocarbyl group; R' and R" cannot both be hydrogen; and q can be an integral from 2 to about 75. In some examples, both R' and R" can be saturated and each R' and R" can independently be an alkyl, an aryl, an alkylaryl, or an acetyl. In other examples, each R' and R" can independently be methyl, ethyl, propyl, butyl, pentyl, isomers thereof, or derivatives thereof.

In one or more embodiments, the degradable particles of the FCM 220A can be or include, but are not limited to, one or more anhydrous salts. For example, the degradable particles of the FCM 220A can be or include one or more borates, such as anhydrous sodium tetraborate.

In one or more embodiments, the stimulation treatment slurry 222A can include, but is not limited to, one or more carrier fluids (e.g., such as a fracturing fluid), a FCM (e.g., such as FCM 120, FCM 220A-220D), and the stimulation material 230. Although not shown in FIG. 2, the stimulation treatment slurry 222A can include different stimulation material types, dimensions, etc. For example, the stimulation treatment slurry 222A can include a first proppant and a second proppant where the average particle size of the first proppant can be less than the average particle size of the second proppant, and the first proppant and the second proppant can have different compositions. Further, the average particle size of the FCM 220A can be at least two, three, four, five, or more times greater than the average particle size of the first proppant and/or the second proppant.

The stimulation treatment slurry 222A can include about 0.01 wt %, about 0.03 wt %, about 0.05 wt %, about 0.07 wt %, or about 0.1 wt % to about 0.2 wt %, about 0.3 wt %, about 0.5 wt %, about 0.7 wt %, about 0.9 wt %, or about 1 wt % of the FCM 220A, based on a combined weight of the first proppant and the second proppant. For example, the stimulation treatment slurry 222A can include about 0.01 wt % to about 1 wt %, about 0.03 wt % to about 0.5 wt %, about 0.07 wt % to about 0.2 wt % of the FCM 220A, based on a combined weight of the first proppant and the second proppant.

The stimulation treatment slurry 222A can include about 8 wt %, about 10 wt %, about 12 wt %, or about 15 wt % to about 18 wt %, about 20 wt %, about 22 wt %, or about 25 wt %, based on a combined weight of the first proppant and the second proppant. For example, the stimulation treatment slurry 222A can include about 10 wt % to about 25 wt %, about 12 wt % to about 22 wt %, or about 15 wt % to about 20 wt % of the first proppant, based on a combined weight of the first proppant and the second proppant.

The stimulation treatment slurry 222A can include about 75 wt %, about 78 wt %, about 80 wt %, or about 82 wt % to about 85 wt %, about 88 wt %, about 90 wt %, or about 92 wt % of the second proppant, based on a combined weight of the first proppant and the second proppant. For example, the stimulation treatment slurry 222A can include about 75 wt % to about 90 wt %, about 80 wt % to about 85 wt %, or about 78 wt % to about 88 wt % of the second proppant, based on a combined weight of the first proppant and the second proppant.

In one or more examples, the stimulation treatment slurry 222A can include the carrier fluid 228, about 0.01 wt % to about 1 wt % of the FCM 220A, about 10 wt % to about 25 wt % of a first proppant, and about 75 wt % to about 90 wt % of a second proppant, based on a combined weight of the first proppant and the second proppant. In other examples the stimulation treatment slurry 222A can include the carrier fluid 228, about 0.03 wt % to about 0.5 wt % of the FCM 220A, about 12 wt % to about 22 wt % of the first proppant, and about 78 wt % to about 88 wt % of the second proppant, based on a combined weight of the first proppant and the second proppant. In other examples, the stimulation treatment slurry 222A can include the carrier fluid 228, about 0.05 wt % to about 0.25 wt % of the FCM 220A, about 15 wt % to about 20 wt % of the first proppant, and about 80 wt % to about 85 wt % of the second proppant, based on a combined weight of the first proppant and the second proppant.

In one or more examples, the average particle size of the first proppant can be about 50 μm to about 250 μm and the average particle size of the second proppant can be greater than 250 μm to less than 1 mm. In other examples, the average particle size of the first proppant can be about 100 μm to about 200 μm and the average particle size of the second proppant can be about 300 μm to about 850 μm.

The first proppant can be or include, but is not limited to, sand, silica, alumina, or any mixture thereof and the second proppant can be or include, but is not limited to, one or more carbonates, such as calcium carbonate. One source of calcium carbonate can be a ground marble that can have an average particle size of about 30 mesh and about 50 mesh, such as 30-50 White particles, commercially available from Imerys Carbonates.

The stimulation treatment slurry 222A can include, but is not limited to, about 200 wt % to about 1,000 wt % of the carrier fluid 228, based on the combined weight of the first proppant and the second proppant. For example, the stimulation treatment slurry 222A can include about 350 wt % to about 700 wt % of the carrier fluid 228, based on the combined weight of the first proppant and the second proppant. In some examples, the carrier fluid 228 can include water, a salt or brine, a crosslinked fluid, a linear gel, a gelling agent, a mineral acid, an organic acid, an organic solvent, a fluidized nitrogen, a fluidized carbon dioxide, or any mixture thereof. Each of the fluidized nitrogen and the fluidized carbon dioxide can independently be in a liquid state and/or a supercritical state. In one or more examples, the carrier fluid 228 can include one or more gelling agents. Illustrative gelling agents can be or include, but are not limited to, borate crosslinked fluids that contains water, a guar or hydroxypropyl guar (HPG) gelling agent.

In one or more examples, the stimulation treatment slurry 222A can include the carrier 228, about 0.05 wt % to about 0.25 wt % of the FCM 220A, about 10 wt % to about 25 wt % of the first proppant, and about 75 wt % to about 90 wt % of the second proppant, where the weight percentages of the FCM 220A, the first proppant, and the second proppant are based on a combined weight of the first proppant and the second proppant. In some examples, the average particle size of the first proppant can be less than the average particle size of the second proppant, the first proppant can include sand, silica, alumina, or any mixture thereof, the second proppant can include calcium carbonate, the FCM 220A can consist essentially of or consist of the degradable particles, and the average particle size of the degradable particles can be at least two, three, four, five, or more times greater than the average particle size of the first proppant and/or the second proppant.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

In addition to the embodiments described above, many examples of specific combinations are within the scope of the disclosure, some of which are detailed below:

Example 1

A flow constraint material consisting essentially of degradable particles, wherein at least 50% by volume of the degradable particles has an average particle size of about 1 millimeters (mm) to about 6 mm.

Example 2

The flow constraint material of claim 1, wherein at least 50% by volume of the degradable particles has an average particle size of about 2.16 mm to about 3.84 mm.

Example 3

The flow constraint material of claim 1, wherein at least 75% by volume of the degradable particles has an average particle size of about 1 mm to about 6 mm.

Example 4

The flow constraint material of claim 1, wherein the degradable particles comprise a degradable polymer.

Example 5

The flow constraint material of claim 1, wherein the degradable particles comprise a degradable aliphatic polyester having the formula:

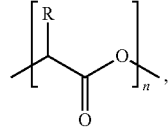

wherein n is an integer and from about 75 to about 10,000, and R is a hydrogen or a substituted or unsubstituted linear, branched, cyclic, heterocyclic, or aromatic hydrocarbyl group.

Example 6

The flow constraint material of claim 5, wherein the hydrocarbyl group is an alkyl, an aryl, an alkylaryl, or an acetyl.

Example 7

The flow constraint material of claim 5, wherein the hydrocarbyl group is methyl, ethyl, propyl, butyl, pentyl, isomers thereof, or derivatives thereof.

Example 8

The flow constraint material of claim 1, wherein the degradable particles comprise a degradable polymeric lactide having the formula:

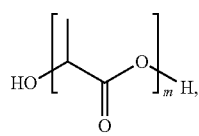

wherein m is an integral from about 2 to about 75.

Example 9

The flow constraint material of claim 1, wherein the degradable particles comprise a degradable polymeric lactide having the formula:

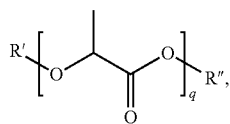

wherein: each R' and R" is independently a hydrogen or a substituted or substituted linear, branched, cyclic, heterocyclic, or aromatic hydrocarbyl group; R' and R" cannot both be hydrogen; and q is an integral from 2 to about 75.

Example 10

The flow constraint material of claim 9, wherein both R' and R" are saturated, and wherein each R' and R" is independently an alkyl, an aryl, an alkylaryl, or an acetyl.

Example 11

The flow constraint material of claim 1, wherein the degradable particles comprise an anhydrous borate.

Example 12

A stimulation treatment slurry, comprising, a carrier fluid, about 0.01 wt % to about 1 wt % of a flow constraint material, about 1 wt % to about 99 wt % of a first proppant, about 1 wt % to about 99 wt % of a second proppant, and wherein the weight percentages of the flow constraint material, the first proppant, and the second proppant are based on a combined weight of the first proppant and the second proppant, an average particle size of the first proppant is less than an average particle size of the second proppant, the first proppant and the second proppant have different compositions, the flow constraint material consists essentially of degradable particles, and an average particle size of the degradable particles is at least two times greater than the average particle size of the second proppant.

Example 13

The stimulation treatment slurry of claim 12, wherein the stimulation treatment slurry comprises about 0.01 wt % to about 1.0 wt % of the flow constraint material and about 100% of a single proppant.

Example 14

The stimulation treatment slurry of claim 12, wherein the stimulation treatment slurry comprises about 1 wt % to about 99 wt % of a first proppant, about 1 wt % to about 99 wt % of a second proppant and about 1 wt % to about 99 wt % of a third proppant.

Example 15

The stimulation treatment slurry of claim 12, wherein the stimulation treatment slurry comprises about 1 wt % to about 99 wt % of a first proppant, about 1 wt % to about 99 wt % of a second proppant, about 1 wt % to about 99 wt % of a third proppant, and about 1 wt % to about 99 wt % of a fourth proppant.

Example 16

The stimulation treatment slurry of claim 12, wherein the stimulation treatment slurry comprises about 1 wt % to about 99 wt % of a first proppant, about 1 wt % to about 99 wt % of a second proppant, about 1 wt % to about 99 wt % of a third proppant, about 1 wt % to about 99 wt % of a fourth proppant, and about 1 wt % to about 99 wt % of a fifth proppant.

Example 17

The stimulation treatment slurry of claim 12, wherein the average particle size of the first proppant is about 50 micrometers (μm) to about 250 μm and the average particle size of a subsequent applied proppant is greater than 250 μm to less than 1 mm.

Example 18

The stimulation treatment slurry of claim 12, wherein the first proppant and the second proppant comprise sand, silica, alumina, or any mixture thereof and a subsequent proppant comprises calcium carbonate.

Example 19

The stimulation treatment slurry of claim 12, wherein the stimulation treatment slurry comprises about 275 wt % to about 3800 wt % of the carrier fluid, based on the combined weight of the first proppant and a subsequent proppant.

Example 20

The stimulation treatment slurry of claim 12, wherein at least 50% by volume of the degradable particles has an average particle size of about 1 mm to about 6 mm.

Example 21

The stimulation treatment slurry of claim 12, wherein the degradable particles comprise a degradable polymer, an anhydrous salt, or a mixture thereof.

Example 22

The stimulation treatment slurry of claim 12, wherein the degradable particles comprise a degradable polymeric lactide.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A flow constraint material consisting essentially of degradable particles comprising a distribution of particle sizes and flowable in a fracturing fluid with proppant particles in a borehole and through a subterranean formation entry point, wherein:
   the distribution of particle sizes is unimodal;
   the distribution of particle sizes comprises at least 50% by volume of degradable particles having a particle size of about 1 millimeter (mm) to about 6 mm; and
   the distribution of particle sizes comprises an average particle size greater than about twice the average proppant particle size and less than about 80% of a dimension of the entry point such that the flow constraint material particles that flow into the entry point only partially restrain flow into the entry point and redistribute flow within the borehole.

2. The flow constraint material of claim 1, wherein at least 50% by volume of the degradable particles has an average particle size of about 2.16 mm to about 3.84 mm.

3. The flow constraint material of claim 1, wherein at least 75% by volume of the degradable particles has an average particle size of about 1 mm to about 6 mm.

4. The flow constraint material of claim 1, wherein the degradable particles comprise a degradable polymer.

5. The flow constraint material of claim 1, wherein the degradable particles comprise a degradable aliphatic polyester having the formula:

$$\left[\begin{array}{c} R \\ | \\ -C-C-O- \\ \| \\ O \end{array}\right]_n,$$

wherein n is an integer and from about 75 to about 10,000, and R is a hydrogen or a substituted or unsubstituted linear, branched, cyclic, heterocyclic, or aromatic hydrocarbyl group.

6. The flow constraint material of claim 5, wherein the hydrocarbyl group is an alkyl, an aryl, an alkylaryl, or an acetyl.

7. The flow constraint material of claim 5, wherein the hydrocarbyl group is methyl, ethyl, propyl, butyl, pentyl, isomers thereof, or derivatives thereof.

8. The flow constraint material of claim 1, wherein the degradable particles comprise a degradable polymeric lactide having the formula:

$$HO\left[\begin{array}{c} -C-C-O- \\ \| \\ O \end{array}\right]_m H,$$

wherein m is an integral from about 2 to about 75.

9. The flow constraint material of claim 1, wherein the degradable particles comprise a degradable polymeric lactide having the formula:

$$R'\left[\begin{array}{c} -O-C-C-O- \\ \| \\ O \end{array}\right]_q R'',$$

wherein:
   each R' and R" is independently a hydrogen or a substituted or substituted linear, branched, cyclic, heterocyclic, or aromatic hydrocarbyl group;
   R' and R" cannot both be hydrogen; and
   q is an integral from 2 to about 75.

10. The flow constraint material of claim 9, wherein both R' and R" are saturated, or wherein each R' and R" is independently an alkyl, an aryl, an alkylaryl, or an acetyl.

11. The flow constraint material of claim 1, wherein the degradable particles comprise an anhydrous borate.

* * * * *